Aug. 28, 1934.   E. R. COX   1,972,061
RECOVERY OF GASOLINE FROM NATURAL GAS
Filed Oct. 18, 1930
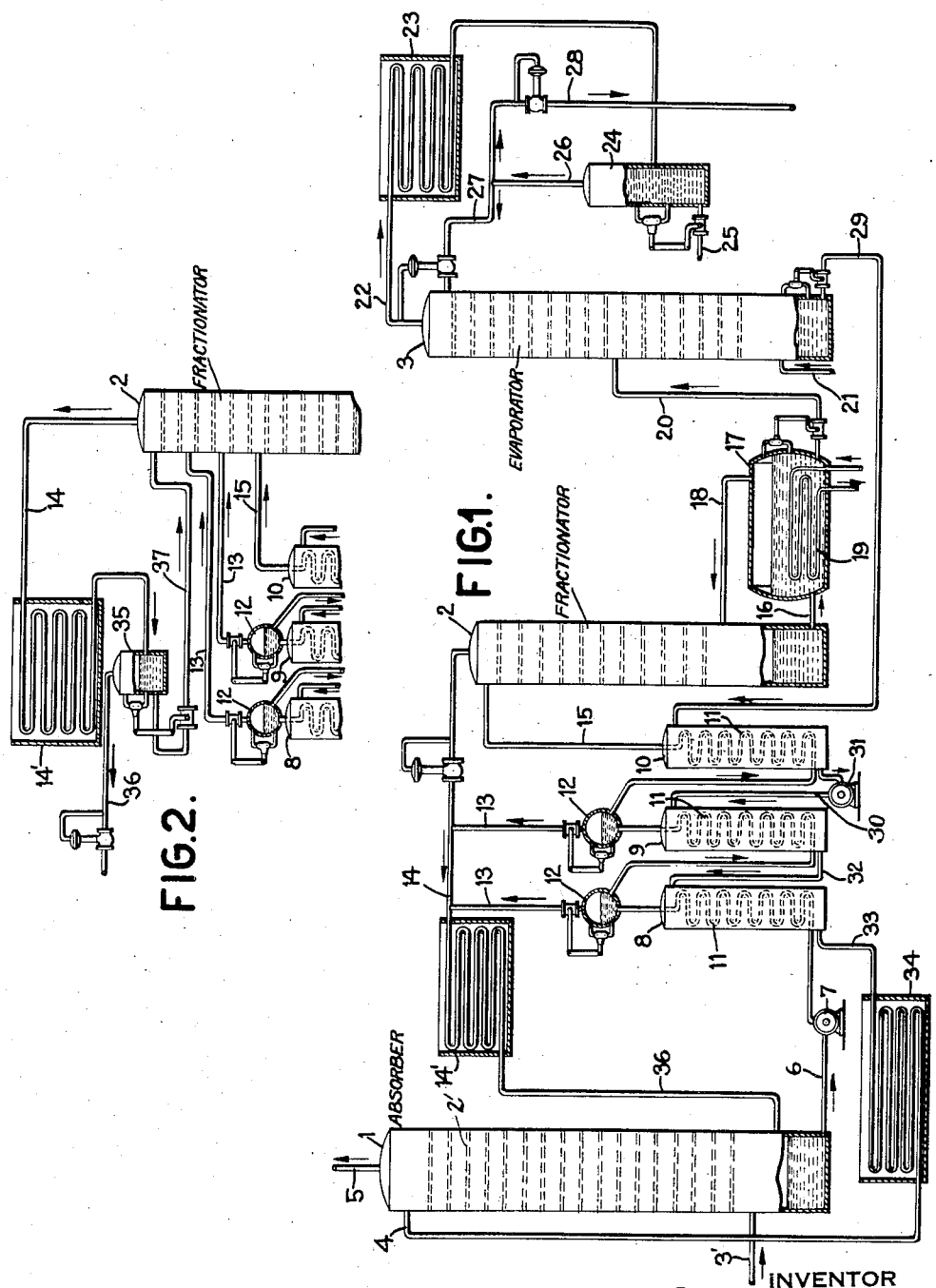
INVENTOR
Edwin R. Cox
BY ATTORNEY
R. J. Dearborn Patented Aug. 28, 1934

1,972,061

UNITED STATES PATENT OFFICE 1,972,061

RECOVERY OF GASOLINE FROM NATURAL GAS

Edwin R. Cox, Los Angeles, Calif., assignor to The Texas Company, New York, N. Y., a corporation of Delaware Application October 18, 1930, Serial No. 489,499

6 Claims. (Cl. 196—8)

This invention relates to the recovery of gasoline from natural gas in a liquid absorption medium and relates particularly to the treatment of the rich absorbent liquid to fractionate the absorbed gasoline constituents and to remove undesirable components prior to the recovery of the desired gasoline from the absorbent.

The common practice of recovering gasoline from natural gas is to absorb all the gasoline and a substantial amount of light combustible hydrocarbons in an absorbent liquid. The resulting rich absorbent is then passed through a heat exchanger in heat exchange with hot denuded absorbent liquid, then through a preheater to raise the liquid to a distillation temperature, and finally the absorbed products are distilled from the absorbent in an evaporator with just enough fractionation to control the end point of the distillate. Since all the wild fractions are present in the vapors, in order to condense a substantial portion, it is necessary to maintain a considerable pressure, approximately 25 lbs. per sq. in. on the evaporator and the condenser. The distillation, under this pressure, requires a large amount of steam to strip the heavy gasoline components from the absorbent. Moreover, only about one half of the vapors from the evaporator are condensed and the remainder vented off from the condensers and compressed to a pressure from 150 to 200 lbs. per sq. in. to recover the uncondensed gasoline from the vapors. The condensate from the condensed vapors is then mixed with the distillate from the evaporator and the combined product fractionated in a column, commonly known as a stabilizer or rectifier, in order to separate the undesired light combustible hydrocarbons from the desired gasoline components. It will be observed, therefore, from this description of prior methods, that a large amount of undesirable light gases and vapors not only circulate through the system, but also they make more difficult the recovery and fractionation of the desired gasoline.

The principal object of the present invention is to eliminate from the absorbent the undesired fractions of the absorbed gasoline in the early stages of the operation instead of at the end of the process as has been done heretofore. Accordingly, the invention contemplates the charging of the rich absorbent to a fractionating column, wherein a sharp separation of undesirable constituents from the absorbent liquid is made. This fractionating column is provided with a reboiler so that the rich absorbent can be reboiled and the vapors passed to the fractionator. The desirable gasoline components separated from the vapors in the fractionator are recombined with the absorbent with the result that the rich absorbent from the reboiler contains only the desirable gasoline, while the undesirable constituents pass from the fractionator back to the absorber to be forced out of the system with the dry gases.

The chief advantage of the invention is substantial saving in the cost of recovering gasoline from natural gas. This saving is accomplished in several ways, both in operating expense and in cost of apparatus. Thus, a saving in power can be made since no vapors must be compressed to recover the gasoline content. A saving in steam may be made in the distillation since a low pressure is maintained on the final evaporator. A saving in cooling water for condensing is accomplished as a result of decreased volume of vapors and the small quantity of steam carried in the vapors. Also, the cost of installation of apparatus is substantially reduced, due to the simpler arrangement, fewer parts and less piping, valves and fittings. Other advantages will be apparent as the apparatus and process are described.

In the accompanying drawing, Fig. 1 is a sectional elevation of an apparatus embodying the features of the present invention.

Fig. 2 is a sectional elevation of a slightly modified embodiment.

Referring to the drawing by numerals, 1 indicates an absorber, 2 a fractionator or rectifier, and 3 an evaporator. The absorber consists of an upright tower containing baffle plates 2'. A wet gas inlet 3' communicates with the absorber, preferably below the bottom plate. However, to insure better fractionation, the wet gas inlet may be raised to about midway of the tower and the height of the tower correspondingly increased so that considerable fractionation may be accomplished in the lower portion of the tower below the wet gas inlet. A lean oil inlet 4 communicates with the top of the tower, preferably above the top plate. A dry gas pipe 5 extends from the top of the tower to dispose of the scrubbed gases. A rich oil pipe 6, in which is interposed a pump 7, connects the bottom of the absorber with a series of heat exchangers 8, 9 and 10. Each of the heat exchangers contain a coil 11 for conducting the rich oil through the exchangers. The heat exchangers are shown in three sections with a pair of vents, 12, interposed between the coils 11 of exchangers 8 and 9 and 9 and 10. The division of the heat exchangers into three sections is not strictly essential to the process. Therefore, the invention contemplates the use of a single heat exchanger with or without the venting of vapors therefrom. Vapor pipes 13 conduct vapors from each of the vents to a lateral pipe 14 leading back to the bottom of the absorber to enter thereto near the wet gas inlet. A pipe 15 conducts the rich oil from the coil 11 in the last heat exchanger 10 to the top of the fractionator to enter above the top plate.

The fractionater 2 consists likewise of a vertical tower. The vapor line 14 previously mentioned, extends from the top of the tower to the bottom of the absorber. A liquid pipe 16 connects the bottom of the fractionator with a reboiler 17, and a vapor pipe 18 communicates between the reboiler and the fractionator, preferably entering just below the bottom plate of the fractionator. A steam coil 19 is submerged in the liquid in the reboiler to supply heat thereto. A pipe 20 carries liquid from the reboiler to the evaporator 3 having the inlet to the evaporator preferably about midway of the tower.

The evaporator 3 is a conventional type for stripping gasoline from a rich absorbent in which stripping occurs in the lower portion and fractionation in the upper portion. A steam line 21 communicates with the lower portion of the stripping section. A vapor pipe 22 extends from the top of the evaporator through a condenser 23 to a receiver 24. A water pipe 25 drains the condensed steam from the receiver. A condensate line 26 connects with branch lines 27 and 28, communicating with the top of the evaporator and a storage tank (not shown) respectively. A lean oil pipe 29 extends from the bottom of evaporator to the heat exchangers 8, 9 and 10. Connecting line 30 in which is interposed the pump 31 and connecting line 32, join the three heat exchangers. From heat exchanger 8, pipe 33 conducts the lean oil to cooler 34 from whence it passes by way of pipe 4 back to the absorber.

Referring to the modification shown in Fig. 2, the vapor lines 13 communicating with the vents 12, lead to the fractionator 2, entering thereto at different levels, according to the volatility of the vapors. The vapor line 14 connected to the top of fractionator 2 extends through condenser 14' to a receiver 35. A pipe 36 conducts uncondensed vapors from the receiver to the absorber while the liquid line 37 conveys the condensate to the top of the fractionator entering thereto above the top vapor line 13.

In practicing the invention with an apparatus such as that illustrated in the drawing, a wet gas containing a substantial amount of gasoline is passed into the absorber through the line 3' and bubbles up through the baffle plates countercurrent to the lean oil introduced to the top of the tower through pipe 4. The temperature of the lean oil is usually maintained so that substantially only vapors of boiling point lower than butane escape with the dry gas issuing from the absorber. The absorber is preferably maintained under a working pressure of approximately 30 lbs. per square inch. A rich oil at about 85° F. containing gasoline and a substantial amount of light combustible hydrocarbons is forced by pump 7 through coils 11 in the heat exchangers where it is heated by the lean oil from the evaporator to about 240° F. before it is introduced into the fractionator 2. Vapors may be released from the vents 12 in which case the vapor escaping from the vent at the exit of the heat exchanger 8 would have a temperature of approximately 125° F. while the vapors escaping from the second vent would have a temperature of approximately 175° F. These vapors mixed with those from the fractionator are cooled in cooler 14' to about 80° F. prior to their return to the bottom of the absorber.

The fractionator is maintained under a pressure of about 35 lbs. per square inch. This pressure is slightly above the pressure in the absorber, thereby actuating the flow of vapors from the vents 12 and the fractionator back to the absorber. As the rich oil passes down over the plates in the fractionator, the undesirable constituents are separated from the rich absorbent. To insure the removal of all constituents more volatile than the desired gasoline, the rich absorbent is drawn from the bottom of the fractionator and conducted to a reboiler 17, wherein the liquid is heated to a temperature of about 330° F. by means of the steam coil 19. At this temperature the last traces of undesirable constituents and also a substantial amount of gasoline vapors are vaporized from the rich absorbent and passed back to the fractionator through pipe 18. These vapors are fractionated in the tower 2 in the presence of the rich absorbent so that the undesired constituents are separated and the desired gasoline vapors reabsorbed by the rich absorbent.

A rich absorbent oil containing substantially only the desired gasoline components is drawn from the reboiler and injected into the midsection of the evaporator 3. A pressure of approximately 15 lbs. per square inch is maintained on the evaporator, thereby substantially reducing the pressure on the rich absorbent. This materially aids the distillation and also substantially reduces the steam required to be introduced through the pipe 21 to completely strip the absorbent oil of its gasoline content. The evaporator 3 is the conventional type for removing gasoline from absorbent oil and consists of a vertical tower, the lower portion below the rich oil inlet 20 comprising the stripping section while that above the rich oil inlet comprises a fractionating tower. Gasoline vapors are drawn from the evaporator through the line 22 and since they contain no wild fractions, they are completely condensed in condenser 23 and a stable gasoline collected in receiver 24. This gasoline may be conducted to storage through line 28, however, it is preferable to divert a portion through the line 21 to act as a reflux for controlling the end point of the vapors at the top of the evaporator.

A lean absorbent oil is drawn from the bottom of the evaporator and is usually under sufficient pressure to flow by itself through the section 10 of the heat exchangers. The pump 31 then forces lean oil through the remainder of the heat exchangers back to the top of the absorber. In the heat exchangers, the lean oil is cooled and at the same time the heat transferred to the rich absorbent oil passing in heat exchange therewith. The lean oil issuing from the heat exchangers is usually further cooled in cooler 34 to approximately 70° F. before introduction into the top of the absorber.

In the modification shown in Fig. 2, the vapors from vents 12 instead of being returned directly to the absorber through the line 14, are passed to the fractionator 2, entering at different heights according to their volatility. Therefore, the heavy vapors at higher temperature are introduced into the lowest portion of the tower, while the cooler, more volatile fractions are introduced toward the top of the tower. The order of introduction of the products to the fractionator 2 are preferably the rich oil from the heat exchanger 10, about 240° F. in temperature, through line 15 at the lowest point. The vapors vented from heat exchangers 9 and 8 at about 175° F. and 125° F. respectively at successively higher levels through pipes 13. The vapors are fractionated in the fractionating tower and the undesirable constituents are withdrawn through pipe 14 and the heavier portions condensed in the cooler 15. The cool condensate at about 80° F. is collected in receiver 35 and passed back to the fractionating tower, entering at the highest point to act as a reflux medium for controlling the end point of vapors escaping from the fractionator. The uncondensed vapors from the receiver are returned to the bottom of the absorber, entering thereto at about 80° F.

While particular embodiments of the invention have been described and shown and certain methods of operation embraced therein for purposes of explanation, it will be obvious that other modifications and variations fall within the scope of the invention which is defined in the appended claims.

I claim:

1. In an apparatus for recovering gasoline from natural gas the combination of an absorber, one or more heat exchangers and a fractionator, means for passing rich absorbent from the absorber through the heat exchangers to an intermediate point of said fractionator, means for venting off vapors from the heat exchangers, a vapor pipe for withdrawing vapors from the top of the fractionator, a cooler, means for passing vapors removed from the heat exchangers and the fractionator through the cooler to the absorber, a reboiler, pipes for passing liquids from the fractionator to the reboiler and vapors from the reboiler to the fractionator, an evaporator and means for passing liquids from the reboiler to the evaporator.

2. The method for recovering a stable gasoline from natural gas which comprises absorbing the gasoline and like constituents from the natural gas in a liquid absorbent, passing the resultant rich absorbent through one or more zones of heat exchange and preheating, venting off light constituents vaporized in said zones and conducting the same to a fractionator, charging the preheated rich absorbent downwardly through said fractionator wherein additional light constituents dissolved in the absorbent are vaporized, fractionating the vapors in said fractionator, withdrawing from the upper portion of the fractionator vapors of substantially all constituents lighter than the desired gasoline, cooling said withdrawn constituents and conducting them to the absorber, subjecting the rich absorbent collecting at the bottom of the fractionator to a partial distillation in a reboiler adjacent to and outside of said fractionator wherein the lighter constituents of the gasoline including any remaining undesirable constituents are vaporized and the vapors returned to the fractionator, withdrawing the rich absorbent containing essentially only the desired gasoline constituents from the reboiler and distilling therefrom a stable gasoline.

3. The method for recovering gasoline from natural gas which comprises absorbing the gasoline and like constituents from the natural gas by a liquid absorbent, passing the resultant rich absorbent through one or more heat exchangers wherein the absorbent is preheated and the lighter of the absorbed constituents vaporized, venting the vaporized constituents from the heat exchangers, passing the rich absorbent from the heat exchangers to a fractionator wherein the absorbent passes downwardly over contact means to vaporize and fractionate a portion of the absorbed constituents, withdrawing constituents lighter than the desired gasoline from the top of the fractionator, cooling the vapors removed from the heat exchangers and the fractionator and conducting the same to the absorber, collecting a pool of the rich absorbent at the bottom of the fractionator and conducting the same through a reboiler adjacent to and outside of the fractionator wherein all remaining constituents lighter than the desired gasoline are vaporized from the absorbent and returned to the fractionator, withdrawing and subjecting the rich absorbent from the reboiler to a distillation operation to recover the desired gasoline and passing the resultant lean absorbent through said heat exchangers.

4. The method for recovering gasoline from natural gas which comprises absorbing the gasoline and like constituents from the natural gas in a liquid absorbent, passing the resultant rich absorbent through one or more heat exchangers wherein the more volatile constituents are vaporized and vented therefrom, passing the rich absorbent from the heat exchangers to an intermediate portion of a rectifier, conducting said constituents vented from the heat exchangers to the upper portion of the rectifier, withdrawing a vapor fraction containing constituents lighter than the desired gasoline from the rectifier, partially condensing said vapor fraction and refluxing the resultant condensate to the rectifier, passing the uncondensed portion of said vapor fraction to the absorber, reboiling the rich absorbent collecting in said rectifier in a reboiler adjacent to and outside of the rectifier to vaporize substantially all constituents lighter than the desired gasoline, returning the vaporized products from the reboiler to the rectifier, withdrawing and subjecting the rich absorbent from the reboiler to a distillation operation to recover a stable gasoline therefrom and conducting the resultant lean absorbent through the heat exchangers to the absorber.

5. In an apparatus for recovering gasoline from natural gas, the combination of an absorber, one or more heat exchangers, a rectifier, means for passing rich absorbent from the absorber through the heat exchangers to the rectifier, means for venting vapors from the heat exchangers and passing the same to the rectifier, means for withdrawing vapors from the rectifier, means for cooling and returning said vapors withdrawn from the rectifier to the absorber, a reboiler outside of and adjacent to said rectifier, vapor and liquid connections between the reboiler and rectifier, an evaporator and connections between the reboiler and evaporator.

6. An apparatus substantially as described in claim 5 and in addition thereto means for separating a condensate from said cooling means and means for returning said condensate to the rectifier as a reflux medium.

EDWIN R. COX.